United States Patent [19]

Coppola

[11] 4,379,985
[45] Apr. 12, 1983

[54] BIPOLAR DRIVER WITH ILLEGAL CODE DETECTOR

[75] Inventor: Vincent G. Coppola, Branford, Conn.

[73] Assignee: Pitney Bowes Inc., Stamford, Conn.

[21] Appl. No.: 378,371

[22] Filed: May 14, 1982

Related U.S. Application Data

[63] Continuation of Ser. No. 260,465, May 4, 1981, which is a continuation of Ser. No. 49,241, Jun. 18, 1979.

[51] Int. Cl.³ .............................................. H02P 1/22
[52] U.S. Cl. .................................... 318/293; 318/65; 318/256; 318/280
[58] Field of Search ............... 318/280, 293, 291, 256, 318/54, 55, 65, 257, 10; 307/40, 38, 138; 361/171, 172

[56] References Cited

U.S. PATENT DOCUMENTS

| | | | |
|---|---|---|---|
| 3,144,598 | 8/1964 | Merritt | 318/257 X |
| 3,146,390 | 8/1964 | Wolff | 318/293 X |
| 3,480,849 | 11/1969 | Thornsen et al. | 318/257 |
| 3,525,883 | 8/1970 | Iordanidis | 318/293 X |
| 3,568,024 | 3/1971 | Robbins | 318/293 X |
| 3,965,402 | 6/1976 | Mogle | 318/55 |
| 4,079,298 | 3/1978 | Prager | 318/280 |
| 4,124,811 | 11/1978 | Anderson | 318/293 |

*Primary Examiner*—Ulysses Weldon
*Attorney, Agent, or Firm*—Peter Vrahotes; Melvin J. Scolnick; Albert W. Scribner

[57] ABSTRACT

A bipolar driver controls the operation of a reversible polarity load such as a motor. The driver links one terminal of the motor with either a positive or a negative potential power supply in response to processor command signals comprising a combination of logic levels appearing at a pair of driver input lines. The input lines are monitored to detect the presence of an illegal code combination which would otherwise function to simultaneously interconnect the load terminal with both positive and negative power supplies. The load terminal is linked to the power supplies by a separate power transistor for each power supply. Each power transistor is biased into conduction through a drive transistor. Upon detection of an illegal code, monitoring logic generates a signal which interrupts the emitter circuit of each of the drive transistors to inhibit both power transistors.

12 Claims, 4 Drawing Figures

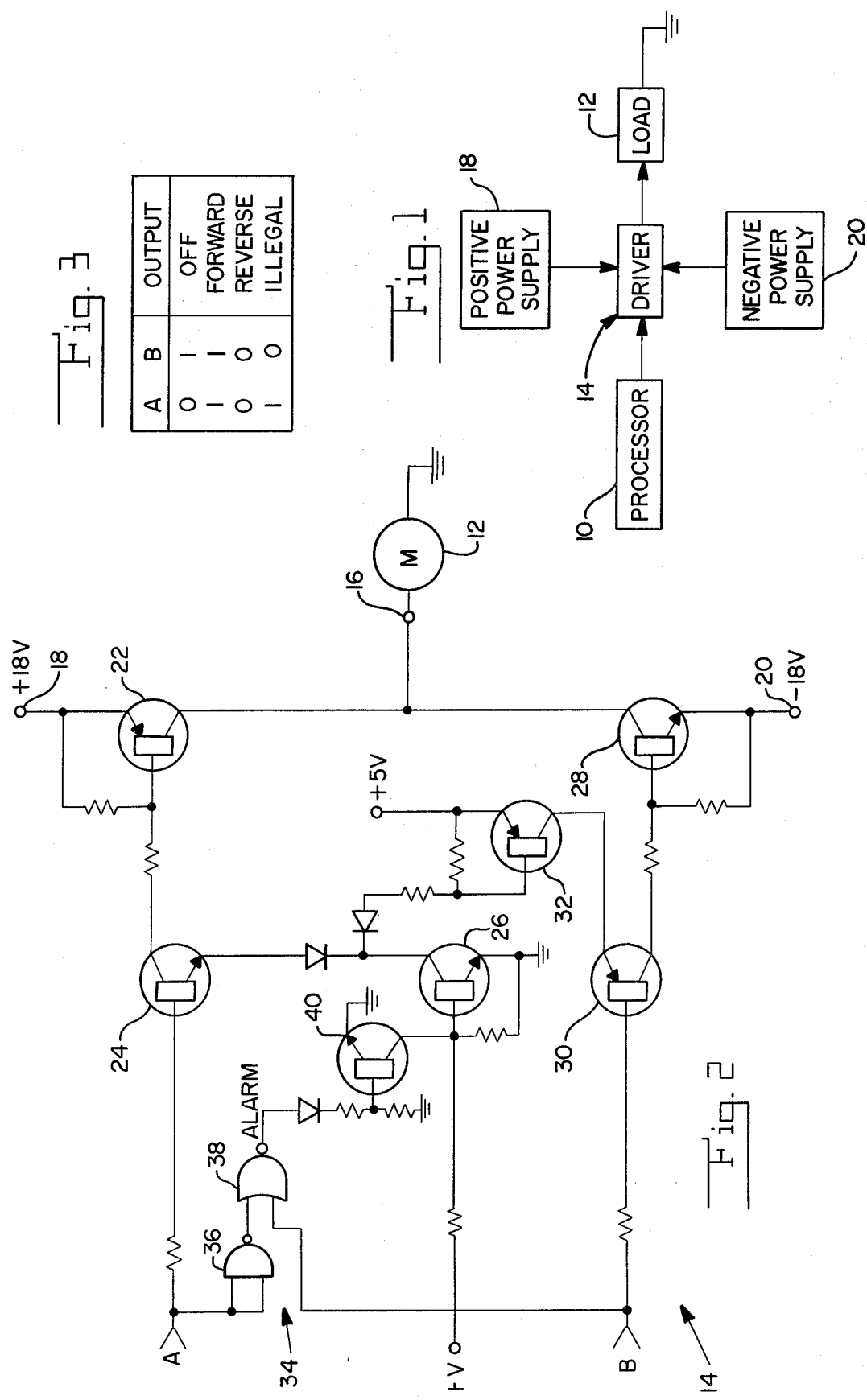

BIPOLAR DRIVER WITH ILLEGAL CODE DETECTOR

RELATED APPLICATIONS

This is a continuation of application Ser. No. 260,465, filed May 4, 1981 which is a continuation of application having Ser. No. 049,241 filed June 18, 1979.

This invention relates to an illegal code detector and inhibit for a bipolar driver such as that employed in conjunction with a copending application of Vincent Coppola entitled Motor Control System filed Dec. 13th, 1978, Ser. No. 970,523, and assigned to the assignee of the present invention.

BACKGROUND OF THE INVENTION

1. Field of the Invention

The invention relates generally to peripheral devices for use in conjunction with processor controlled systems and more particularly to drivers for reversible polarity loads.

2. Brief Description of the Prior Art

Control of stepping motors and reversible motors in processor implemented systems has heretofore been achieved through unipolar driver interfaces which reversed the polarity of the power supply at each terminal of the motor in response to command signals from a processor.

The use of bipolar drivers for selectively interconnecting a single terminal of a motor with either a positive or negative potential power supply greatly reduced the number of driver components required. A major disadvantage with bipolar drivers was the possibility that, if the system processor generated an illegal, i.e. invalid, control signal, the bipolar driver would link both the positive and negative potentials to the terminal at the same time.

Reliance upon the processor code generation routine alone to inhibit generation of an invalid code was not prudent. Processor and/or programming malfunction raised the potential for creating major damage to the power supplies and the bipolar driver due to the transmittal of an invalid code to the driver.

SUMMARY OF THE INVENTION

The present invention includes a bipolar driver which is employed to interface a reversible load such as a motor with a processor-controller. The processor transmits code command signals to the driver along input lines. Both positive and negative potential power supplies are each selectively connected with a single terminal of the load by a pair of power transistors. Each of the power transistors is controlled by a pre-amp driver transistor, the operation of which is responsive to the code command signal.

An illegal code detector functions to interrupt the emitter circuit of each of the pre-amp drivers in the presence of an invalid code command signal. The detector includes logic gates which monitor the input lines and generate an alarm signal in the presence of the invalid code. The alarm signal forward biases an alarm drive transistor which in turn switches a further transistor to interrupt the emitter circuit of the pre-amp driver transistors and thereby inhibit the power transistors.

From the foregoing compendium, it will be seen that it is an object of the present invention to provide a bipolar driver of the general character described which is not subject to the disadvantages aforementioned.

A further object of the present invention is to provide an interface of the general character described between a processor-controller, power supplies of reverse potential and a reversible polarity load which includes an invalid code detector operable to inhibit interconnection of the load and the power supplies in the presence of an invalid control signal.

A further object of the present invention is to provide an illegal code detector adapted for use in conjunction with a bipolar driver of the general character described and which functions to monitor processor control signals to prevent driver response to an invalid control signal.

Another object of the present invention is to provide a bipolar driver interface interconnecting a processor-controller, opposite potential power supplies and a reversible polarity load which is low in cost, highly reliable and includes a self contained safety monitor.

Another object of the present invention is to provide a bipolar driver of the general character described which safely controls the operation of a reversible polarity load with but a modicum of components.

Other objects of the invention in part will be obvious and in part will be pointed out hereinafter.

With these ends in view, the invention finds embodiment in certain combinations of elements, arrangements of parts and series of steps by which the objects aforementioned and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention, FIG. 1 is a schematized block diagram illustrating a processor controlled system including a processor and a bipolar driver constructed in accordance with the present invention interconnecting a load with either of two reverse polarity power supplies in response to signals from the processor;

FIG. 2 is a schematic illustration of a typical driver constructed in accordance with the present invention shown selectively interconnecting a single terminal of a reversible polarity motor with either a positive or a negative potential power supply in response to command signals;

FIG. 3 is a truth table showing the various motor outputs responsive to the logic level inputs at the driver.

DESCRIPTION OF THE PREFERRED EMBODIMENTS

Figure 4:
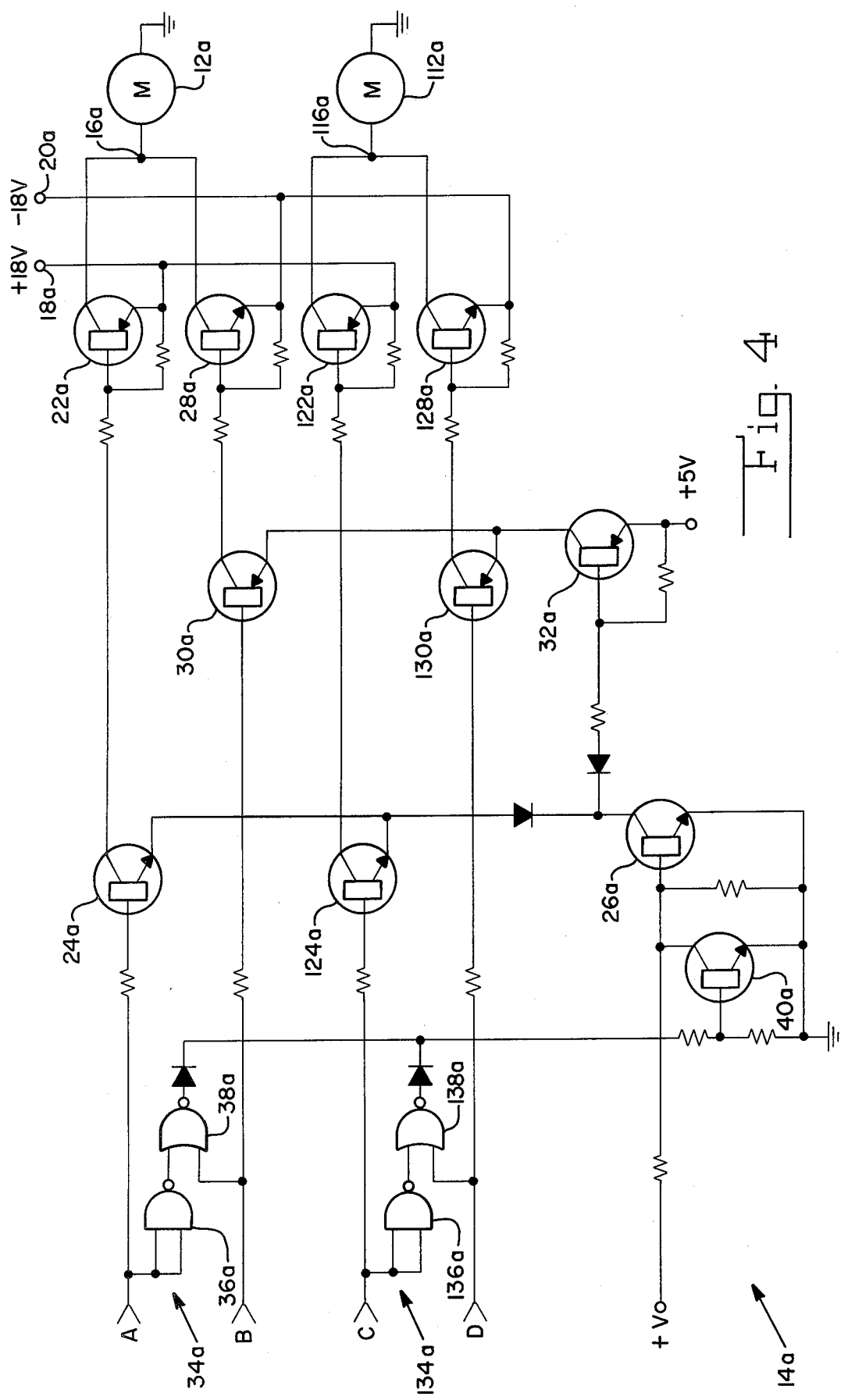
FIG. 4 is a schematic illustration of a typical driver circuit employed for the control of a plurality of motors and illustrating the implementation of an illegal code detector in such embodiment.

Referring now in detail to the drawings, FIG. 1 depicts a typical processor implemented system including a processor-controller 10 which is interfaced with a reversible load 12 such as a reversible motor. The interface comprises a bipolar driver 14 constructed in accordance with and embodying the invention. The driver 14 selectively interconnects a single terminal 16 of the load with either a positive potential power supply 18 or a negative potential power supply 20. It should be appreciated that the opposite terminal of the load is effectively grounded. Thus the positive and negative power supplies represent sources of constant voltage and opposite polarity relative to the potential at such grounded terminal.

From an observation of FIG. 2 wherein a typical bipolar driver circuit is depicted, it will be seen that the driver 14 employs two input terminals designated A and B which receive a code command signal comprising either high or low logic level signals from the processor 10.

A PNP power transistor 22 selectively interconnects the terminal 16 of the load 12 with the positive potential power supply 18. The power transistor 22 is normally reverse biased by a resistor which interconnects its base and the positive power supply 18. A pre-amp driver NPN transistor 24 which is conductively biased in the presence of a high logic signal appearing at the driver input terminal A serves to forward bias the power transistor 22. The emitter-collector circuit of the pre-amp driver 24 effectively reduces the base potential at the power transistor 22 to switch the power transistor 22 into conduction through the emitter-collector circuit of a further NPN transistor 26 which is normally forward biased by a constant positive voltage supply.

With reference now to the truth table shown in FIG. 3, in order to provide operation of the load in one direction, e.g. clockwise motor rotation, the input terminal A receives a high logic level signal while the input to the terminal B of the driver circuit also receives a high logic level signal.

The high logic level at terminal B is effective to switch off a negative potential power transistor 28 which interconnects the load terminal 16 and the negative power supply 20. The base of the negative power transistor 28 is interconnected with the collector of a pre-amp driver PNP transistor 30. The driver transistor 30 is biased by the signal at the input terminal B. With a high signal appearing at terminal B, the pre-amp driver transistor 30 is reverse biased and the base potential at the power transistor 28 is that of the negative power supply 20 due to a resistor which interconnects the base and the negative power supply 20.

In order to switch the negative power transistor into conduction, its base potential is raised by presenting a low logic level signal at the input terminal B. This low logic level forward biases the PNP pre-amp driver transistor 30 into conduction. A further PNP transistor 32, which is normally forward biased, interconnects the emitter-collector circuit of the pre-amp driver transistor 30 with a source of positive potential. Thus, in the presence of a low logic level at the input terminal B, the negative power transistor 28 will have its base-to-emitter junction forward biased through the emitter-collector circuits of the transistor 32 and the pre-amp driver transistor 30.

It should be appreciated that the transistor 32 is normally forward biased for conduction through the emitter-collector circuit of the NPN transistor 26. With the transistor 26 switched off, the transistor 32 will be reverse biased through a resistor which interconnects its base and a positive potential source. Thus, the transistor 26 effectively controls the emitter-collector circuits of both pre-amp driver transistors 24 and 30 and, when the transistor 26 is switched off, these circuits will open to inhibit the power transistors 22, 28 from becoming forward biased.

It should be evident that a high logic level at the input terminal A switches the positive power transistor 22 into conduction and a low logic level at the input terminal B switches the negative power transistor 28 into conduction. Low logic level signals at both the inputs A and B provide an interconnection between the negative power supply 20 and the terminal 16 of the load to reverse operation of the load as indicated in the truth table. Further, as also indicated in the truth table, both of the power transistors 22, 28 will be switched off in the presence of a low logic level at the input A and a high logic level at the input terminal B.

As previously mentioned, a major disadvantage with bipolar drivers was the possibility that the processor-controller which provided the input signals would generate an illegal code. In accordance with the present embodiment of the bipolar driver 14, such illegal code would be a combination of a high logic level at the input terminal A which would effectively switch the positive power transistor 22 on and a low logic level at the input terminal B which would effectively switch the negative power transistor 28 on. The result, if such signals were simultaneously applied to the input terminals A and B, would be potential damage to both the driver and the power supply. In accordance with the present invention, an illegal code detector is incorporated in the bipolar driver 14. The illegal code detector functions to inhibit the power transistors 22, 28 upon detection of such invalid code at the driver input terminals A and B.

The illegal code detector includes code monitoring logic denoted generally by the reference numeral 34. The logic 34 taps each input line of the driver 14 to generate an ALARM signal upon detection of the illegal code. The presence of the ALARM signal effects a switching of the transistor 26 to a reverse bias state thereby inhibiting the power transistors 22, 28.

The monitoring logic 34 includes a NAND gate 36 which receives, at both of its inputs, the signal appearing at the driver input terminal A. The NAND gate 36 will thus function as an inverter and provide an output signal which is high when both of its inputs, i.e. the logic level at the input terminal A, is low. The output of the NAND gate 36 is applied at a NOR gate 38 along with the signal appearing at the driver input terminal B. The NOR gate 38 will provide a high output signal which constitutes an ALARM signal when both of its inputs are low. This occurs only when the signal applied to the terminal A is high and the signal applied to the terminal B is low. Such combination constitutes the invalid or illegal code. Thus, the monitoring logic generates a high ALARM signal only when an invalid code combination is transmitted to the bipolar driver 14.

A high ALARM signal generated at the NOR gate 38 effects the switching of an NPN transistor 40 by raising the potential at the base of the transistor 40. The collector of the transistor 40 is connected to the base of the transistor 26 which is normally forward biased by the constant positive potential source. In the presence of a high ALARM signal, the transistor 40 becomes forward biased thereby effectively grounding the base of the NPN transistor 26 so that the transistor 26 will be reverse biased and its emitter-collector circuit will be nonconductive.

Upon this occurrence, the emitter-collector circuit of the pre-amp driver transistor 24 will be interrupted and the pre-amp driver transistor 24 can no longer forward bias the power transistor 22. At the same time, the base of the PNP transistor 32 will be elevated in potential due to the interruption of the ground connection through the emitter-collector circuit of the transistor 26 and the PNP transistor 32 will thereby be switched to a noncondutive state. In such state, the emitter-collector circuit of the pre-amp driver transistor 30 is no longer linked to a positive potential source and the pre-amp driver transistor 30 can no longer function to forward bias the power transistor 28. Thus, in the presence of an illegal code, both the power transistor 22 and the power transistor 28 are inhibited from interconnecting the load terminal 16 to their respective power supplies because the emitter circuit of each of the drive transistors 24, 30 has been interrupted.

A further embodiment of the present invention is illustrated in FIG. 4 wherein like numerals denote like components as described with reference to the prior embodiment, however such numerals bear the suffix "a". The embodiment shown in FIG. 4 is similar to the prior embodiment previously disclosed, however in such embodiment a bipolar driver 14a is designed to simultaneously control the operation of a plurality of loads 12a, 112a by selectively interconnecting a single terminal 16a, 116a, respectively, of each load with either a positive potential power supply 18a or a negative potential power supply 20a.

The bipolar driver 14a includes, in an exemplary manner, two pairs of input lines, one pair having the reference designation A and B and the other having the designation C and D.

Each of the input line pairs includes its own monitoring logic 34a, 134a adapted to detect the presence of an invalid code generated by the processor. The monitoring logic is similar to the logic heretofore disclosed with respect to the prior embodiment and includes a NAND gate 36a, 136a and a NOR gate 38a, 138a, respectively, for each line pair. The logic provides a high level ALARM signal upon the detection of an invalid code.

The ALARM signal generated by either monitoring logic is transmitted to a single NPN transistor 40a which switches into conduction in the presence of such high ALARM signal to reduce the base potential of an NPN transistor 26a which functions in a manner identical to that of the transistor 26 heretofore described.

Each of the input lines A, B, C and D applies its input signal to the base of a pre-amp driver transistor 24a, 30a, 124a, and 130a, respectively, with the driver transistors operating to switch their respective power transistors 22a, 28a, 122a, and 128a, respectively. The pre-amp driver transistors 30a, 130a, which function to bias the NPN negative potential power transistors 28a, 128a have their emitter circuits interconnected to a source of positive potential through a PNP transistor 32a identical in function to the transistor 32 previously described with reference to the prior embodiment.

It will be seen that upon detection of an illegal code at either pair of input lines, the monitoring logic 34a, 134a will generate a high ALARM signal which switches the NPN transistor 40a into conduction to effectively reduce the base potential of the NPN transistor 26a. With the transistor 26a switched off, the emitter-collector circuit of both of the pre-amp driver transistors 24a, 124a are opened which thereby prevents the positive power transistors 22a, 122a from being forward biased.

The reverse biasing of the transistor 26a additionally serves to elevate the potential of the base of the PNP transistor 32a to reverse bias such transistor. With the emitter-collector circuit of the transistor 32a open, the emitter-collector circuit of the pre-amp driver transistors 30a, 130a are no longer connected to a positive potential source and will not function to forward bias their respective negative potential power transistors 28a, 128a.

From the foregoing, it will be appreciated that the illegal code detector serves to simultaneously inhibit all of the power transistors upon detection of an illegal code on any of the input line pairs. It should also be appreciated that, while in the embodiment of FIG. 4 only two pairs of input lines ae shown, additional pairs of input lines, power transistors and loads may be accommodated. Each pair of input lines may include its own monitoring logic for the generation of an ALARM signal to trigger the transistor 40a.

All of the emitter circuits of the pre-amp driver transistors for the positive power transistors are linked to ground through the transistor 26a and all of the emitters of the pre-amp driver transistors associated with the negative power transistors are linked to a positive potential source through the transistor 32a.

Thus, it will be seen that there is provided a bipolar driver with illegal code detector which achieves the various objects of the invention and which is well adapted to meet the conditions of practical use. As various changes might be made in the invention as above set forth, it is to be understood that all matter herein described or shown in the accompanying drawings is to be interpreted as illustrative and not in a limiting sense.

Having thus described the invention, there is claimed as new and desired to be secured by Letters Patent:

1. An interface for a processor, a reversible polarity load having two terminals the first of which terminals being tied to a substantially fixed reference level, and a pair of opposite polarity power supplies, the processor selectively transmitting one of several possible command signal codes to the interface, the signal codes designating different modes of operation of the load, the interface comprising:
 a first power switch means, the first power switch means selectively interconnecting the second of said terminals of the load and the power supply of one polarity,
 a second power switch means, the second switch means selectively interconnecting the second of said terminals and the power supply of opposite polarity,
 means receiving each signal code and
  (a) in response to a first signal code, forward biasing the first power switch means to interconnect the second of said terminals and the power supply of one polarity and reverse biasing the second power switch means such that the second of said terminals is not interconnected with the power supply of the opposite polarity,
  (b) in response to a second signal code, reversing the first power switch means such that the second of said terminals is not interconnected to the power supply of one polarity and forward biasing the second power, switch means to interconnect the second of said terminals and the power supply of the opposite polarity, and
  (c) in response to a third signal code, reverse biasing both power switch means such that the second of said terminals is not connected with either power supply, the interface further comprising illegal signal code inhibit means, the inhibit means including monitoring means receiving the signal codes and in response to an invalid signal code which would otherwise function to forward bias both power switch means, inhibiting the operation of both of said power switch means.

2. An interface constructed in accordance with claim 1 wherein the inhibit means includes means for inhibiting both power switch means in response to an invalid signal code.

3. An interface constructed in accordance with claim 1 wherein each of the power switch means comprises a power transistor, the means receiving each signal code including a driver transistor and including means for interconnecting the emitter-collector circuit of each driver transistor with the base of a respective power transistor.

4. An interface constructed in accordance with claim 3 wherein the inhibit means includes means for interrupting the emitter collector circuit of each driver transistor in response to an invalid signal code.

5. An interface constructed in accordance with claim 3 wherein each signal code comprises a pair of parallel loaded signals, the interface including a pair of input lines, one of the input lines receiving one of the signals and another input line receiving the other signal, means operatively interconnecting the base of one of the driver transistors with the one input line and means operatively interconnecting the base of the other driver transistor with the other input line.

6. An interface constructed in accordance with claim 5 wherein the monitoring means includes gate means operatively interconnected between the input lines, the gate means receiving the signal code and in respone to the presence of an invalid signal code generating an alarm signal, the means for interrupting the emitter-collector circuit of each driver transistor receiving an alarm signal and interrupting the emitter-collector circuit of each driver transistor in response to such alarm signal.

7. An interface constructed in accordance with claim 6 wherein the interface includes switch means for completing the emitter-collector circuit of each driver transistor, the interrupting means including means for reverse biasing the switch means.

8. An interface constructed in accordance with claim 7 wherein said substantially fixed reference level is electrical ground.

9. An interface for a processor, a plurality of reversible polarity loads each of said loads having two terminals the first of which terminals being tied to a substantially fixed reference level, and a pair of opposite polarity power supplies wherein the processor simultaneously transmits a like plurality of command signal codes to the interface, each transmitted code being associated with one of the loads, the interface including a like plurality of first power switch means, each first power switch means selectively interconnecting the second of said terminals of a respective load and the power supply of one polarity, a plurality of second power switch means, each second power switch means selectively interconnecting the second of said terminals of a respective load and the power supply of opposite polarity, the interface further including a like plurality of means receiving each signal code and interconnecting the second of said terminals of the respective load with one of the power supplies in accordance with the signal code, and illegal signal code inhibit means including a like plurality of monitoring means receiving the respective signal codes and in response to an invalid signal code inhibiting the operation of one of the plurality of first power switch means and one of the plurality of second power switch means, both of which power switch means are associated with the respective load.

10. An interface constructed in accordance with claim 8 wherein the inhibit means includes means inhibiting the operation of both power switch means associated with the respective load.

11. An interface constructed in accordance with claim 9 wherein the inhibit means includes means inhibiting the operation of all power switch means.

12. An interface constructed in accordance with claim 11 wherein said substantially fixed reference level is electrical ground.

* * * * *